H. F. SHAW.
Steam Fire-Engine.

No. 224,735.      Patented Feb. 17, 1880.

Attest:
Louis Cohen,
D. L. Smith.

Inventor:
per Henry F. Shaw,
Edw. Dummer,
Atty.

UNITED STATES PATENT OFFICE.

HENRY F. SHAW, OF BOSTON, MASSACHUSETTS.

STEAM FIRE-ENGINE.

SPECIFICATION forming part of Letters Patent No. 224,735, dated February 17, 1880.

Application filed December 29, 1879.

*To all whom it may concern:*

Be it known that I, HENRY F. SHAW, of Boston, in the county of Suffolk and State of Massachusetts, have invented a new and useful Improvement in Steam Fire-Engines, which improvement is fully set forth in the following specification, reference being had to the accompanying drawings.

My invention consists in increasing the effective working capacity of a steam fire-engine, when the water of supply is delivered under pressure to such engine, by a water-motor so attached to the same or so combined with its steam-pump as to utilize the force of said water of supply.

In cities and other large places it is often and for the most part customary for steam fire-engines to receive the supply of water from hydrants, from which the water is delivered under pressure. This pressure is always considerable, and generally great, and hitherto has not been utilized to assist in working the engine or in any way to increase its efficiency, otherwise than that the water will be so delivered that the pump will not be forced to draw the water any distance by suction. Thus the power of said pressure above what is required to carry the water to the level of the pump has heretofore been lost.

I purpose to use this power to increase the working capacity of the engine, either to enable it to throw greater stream or streams, throw them farther, or throw more streams. I do this by attaching to the engine or combining with the pump thereof a water-motor which is operated by the water of supply, and makes available its pressure for the purposes of the engine, the water, after it has been so used, being delivered to the pump as required.

I do not wish to confine my invention to any particular form of water-motor, either rotary, acting by impact as a water-wheel, or by direct pressure, or reciprocating; nor do I wish to confine it to any one manner of attaching the water-motor to or combining it with a steam fire-engine.

Figure 1:
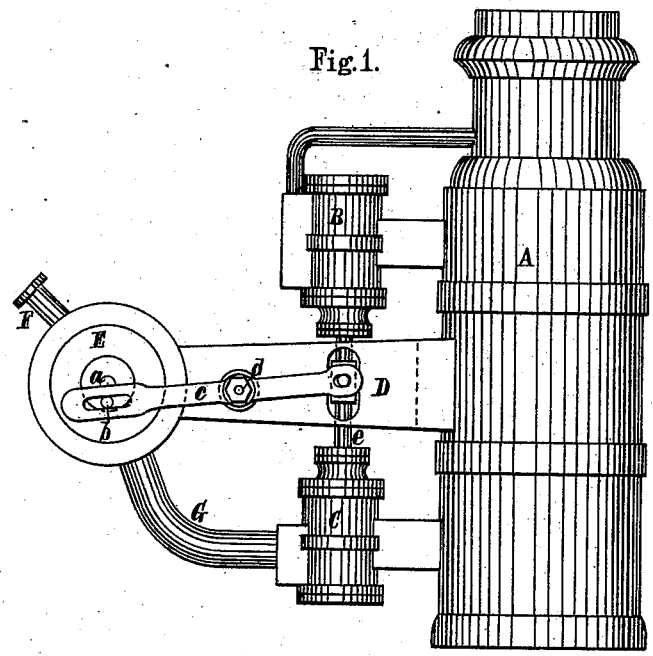
Figure 2:
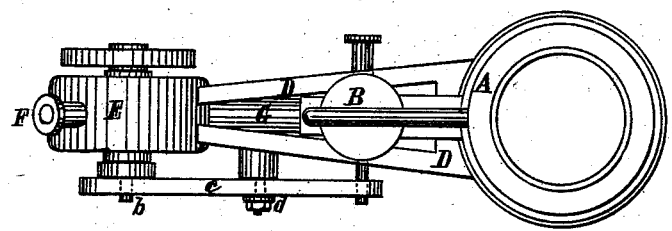

There are many kinds of water-motors well known, and a good mechanist may apply any one of many such motors to produce the desired result in a greater or less degree; but to illustrate a practical method of adapting my invention, I have shown in the accompanying drawings so much of a steam fire-engine having a water-motor combined therewith as serves for such illustration, Figure 1 being a side elevation, and Fig. 2 a plan view.

The portion lettered A represents the steam-boiler, fire-box, smoke-stack, and attachments. B is the steam-cylinder, and C the water-cylinder, of a reciprocating pump employed in a certain class of steam fire-engines. By suitable supports (represented by the frame-work D) a rotary motor, E, is held in proper relation to the pump C. The water of supply is admitted to the water-motor E by an inlet-conduit, F, suitably connected to the hydrant. After acting upon the motor the water passes, by a conduit, G, to the pump C in sufficient quantity to be thrown by the same as required.

The shaft $a$ of the rotary motor has thereon a crank, $b$, which acts by a lever, $c$, pivoted at $d$, to move the piston-rod $e$, connected to the pistons in steam and water cylinders B and C in the usual manner.

The proportions of the mechanism may be such that after the water has exerted on the motor its surplus force it will be delivered at the level of the pump to give as free and ready supply as though the motor formed no part of the machine. The power developed by means of the water-motor acts to operate the pump in combination with the steam-power. The pump may also be operated by the water-motor when there is no supply of steam, and in this way will be found useful— as, for instance, to work the pump before the steam is up to the required pressure. The water-motor operated by the water of supply may also be employed, by means of a second pump, to throw one or more streams, while the steam is doing its work independently of the water-motor.

The ultimate result attained by my invention may be either to increase the efficiency of steam fire-engines of the present size or to do the same work with those of less size, cost, and expense of running, as will readily be seen, since I utilize power that heretofore has been allowed to run to waste.

Should the engine be employed, as it occasionally may be, where the water of supply is not under pressure, then the water may be conducted directly to the pump without passing through the water-motor. The latter may be made so compact that it will add but little to the weight of the machine and will be in comport with it.

I claim as my invention—

In a steam fire-engine, a water-motor arranged in the water-conduit leading from the hydrant to the pump, whereby the pressure of the water of supply may be utilized, substantially as and for the purpose set forth.

HENRY F. SHAW.

Witnesses:
 EDW. DUMMER,
 LOUIS COHEN.